United States Patent [19]

Aramaki

[11] Patent Number: 5,400,591
[45] Date of Patent: Mar. 28, 1995

[54] MEANS FOR PREVENTING EXHAUST EMISSION FROM BEING DETERIORATED IN CASE OF TROUBLE OF SECONDARY AIR SUPPLY SYSTEM

[75] Inventor: Takashi Aramaki, Kawasaki, Japan

[73] Assignee: Nissan Motor Co., Ltd., Yokohama, Japan

[21] Appl. No.: 106,560

[22] Filed: Aug. 16, 1993

[30] Foreign Application Priority Data

Sep. 8, 1992 [JP] Japan .................. 4-239848

[51] Int. Cl.⁶ .............................................. F01N 3/22
[52] U.S. Cl. .................................... 60/274; 60/276; 60/277; 60/289; 60/290
[58] Field of Search ............... 60/274, 276, 277, 289, 60/290

[56] References Cited

U.S. PATENT DOCUMENTS

| | | | |
|---|---|---|---|
| 5,060,474 | 10/1991 | Aramaki | 60/277 |
| 5,119,631 | 6/1992 | Kayanuma | 60/277 |
| 5,140,810 | 8/1992 | Kuroda | 60/274 |

FOREIGN PATENT DOCUMENTS 60-240840 11/1985 Japan.

Primary Examiner—Douglas Hart
Attorney, Agent, or Firm—Foley & Lardner

[57] ABSTRACT

In case of trouble of a secondary air supply system, supply of an additional amount of fuel to an intake system and supply of secondary air to an exhaust system at the time of a particular engine operating condition such as an idling condition are stopped for regulating an air-fuel ratio closer to a stoichiometric value.

10 Claims, 7 Drawing Sheets

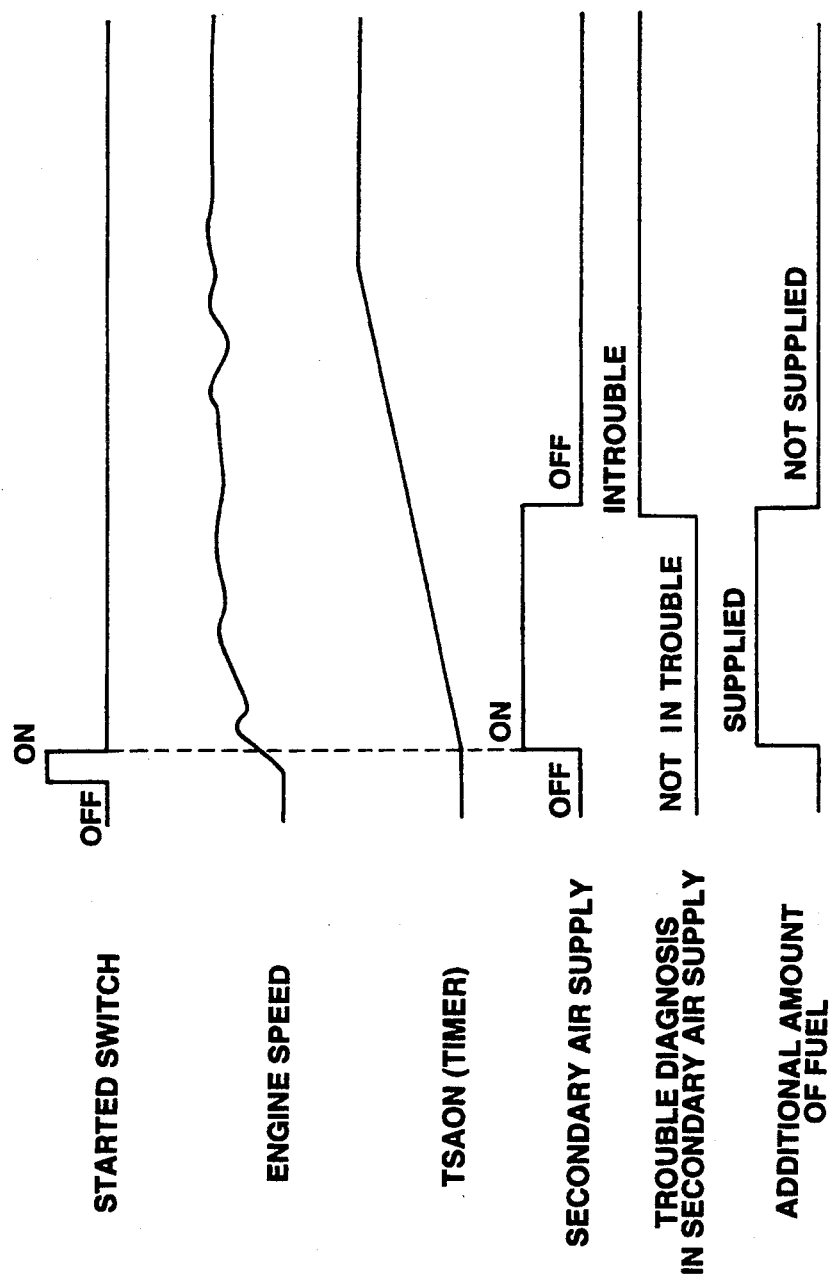

MEANS FOR PREVENTING EXHAUST EMISSION FROM BEING DETERIORATED IN CASE OF TROUBLE OF SECONDARY AIR SUPPLY SYSTEM

BACKGROUND OF THE INVENTION

1. Field of the Invention

The present invention relates in general to an internal combustion engine equipped with a secondary air supply system for supplying its exhaust system with air for recombustion of the exhaust gases and more specifically to means for preventing the exhaust emission from being deteriorated in case of trouble or failure of the secondary air supply system.

2. Description of the Prior Art

In a prior art automotive internal combustion engine, the air-fuel ratio is controlled by a feedback system as disclosed in Japanese Patent Provisional Publication No. 60-240840. By the feedback system, the air-fuel ratio is maintained within a narrow range at stoichiometry so that a catalytic converter can operate with a high conversion efficiency.

Under a particular engine operating condition, e.g., an idling condition, the control by the feedback system is suspended and the air-fuel ratio is maintained at a fixed value for causing a rich mixture so that stable combustion of the mixture is obtained. When this is the case, the CO and HC contents in the exhaust gases are increased. To cope with this problem, a secondary air supply system is used for supplying secondary air to an exhaust passage upstream of the catalytic converter and downstream of an oxygen sensor so that the catalytic converter is supplied with a sufficient amount of air necessary for oxidation of CO and HC. However, in case of malfunction trouble, e.g., clogging of the air cleaner or supply pipe, etc. of the secondary air supply system, it will become impossible to supply a sufficient amount of secondary air to the catalytic converter under the above described particular operating condition in which the feedback control of the air-fuel ratio is suspended, thus not only disabling the catalytic converter to be heated rapidly to a desired high temperature but allowing the unburned particles of CO and HC to be emitted into the atmosphere to cause deterioration of the exhaust emission.

SUMMARY OF THE INVENTION

According to an aspect of the present invention, there is provided a system for preventing deterioration of exhaust emission in case of trouble in secondary air supply in an internal combustion engine. The system comprises an air-fuel ratio sensor disposed in an exhaust passage of the engine for monitoring a content of a constituent of exhaust gases emitted from the engine and producing a feedback signal for control of an air-fuel ratio of a mixture to be supplied to the engine, a catalytic converter disposed in the exhaust passage, particular engine operating condition detecting means for detecting a particular operating condition of the engine and producing a signal indicative thereof, air-fuel ratio feedback control means responsive to the feedback signal from the air-fuel ratio sensor for regulating the air-fuel ratio closer to a target air-fuel ratio at any time other than the time of the particular operating condition of the engine, secondary air supply means responsive to the signal from the particular engine operating condition detecting means for suspending operation of the air-fuel ratio feedback control means at the time of the particular operating condition of the engine and supplying an additional amount of fuel for causing an air-fuel mixture to become richer than that of the target air-fuel ratio whilst at the same time supplying secondary air to the exhaust passage upstream of the catalytic converter, and trouble diagnosis means for making a decision on trouble of said secondary air supply means in such a manner that when it is determined that said secondary air supply means is in trouble, operation of said secondary air supply means is suspended whilst supply of the additional amount of fuel is stopped for bringing the air-fuel ratio closer to the target air-fuel ratio.

According to another aspect of the present invention, there is provided a novel method for preventing deterioration of exhaust emission of an internal combustion engine in case of trouble of a secondary air supply system.

The engine includes an air-fuel ratio feedback control system for regulating an air-fuel ratio of a mixture supplied to the engine closer to a stoichiometric value in response to a feedback signal from a sensor at any time other than the time of a particular engine operating condition, a catalytic converter disposed in an exhaust passage of the engine, and a secondary air supply system for suspending operation of the air-fuel ratio feedback control system at the time of the particular operating condition of the engine and supplying an additional amount of fuel for causing the mixture to become richer than that of the stoichiometric air-fuel ratio whilst supplying secondary air to the exhaust passage upstream of the catalytic converter.

The method comprises determining whether the secondary air supply system is in trouble and stopping supply of the additional amount of fuel by the secondary air supply system for thereby bringing the air-fuel ratio closer to the stoichiometric air-fuel ratio when it is determined that the secondary air supply system is in trouble.

This above structure and method are effective for solving the above noted problem inherent in the prior art system.

It is accordingly an object of the present invention to provide a novel and improved system which can assuredly prevent deterioration of exhaust emission in case of trouble of a secondary air supply system in an internal combustion engine.

It is another object of the present invention to provide a novel method of the above described character.

BRIEF DESCRIPTION OF THE DRAWINGS

FIG. 7 is a time chart for illustration of the operation of a further embodiment.

DETAILED DESCRIPTION OF THE PREFERRED EMBODIMENTS

Figure 1:
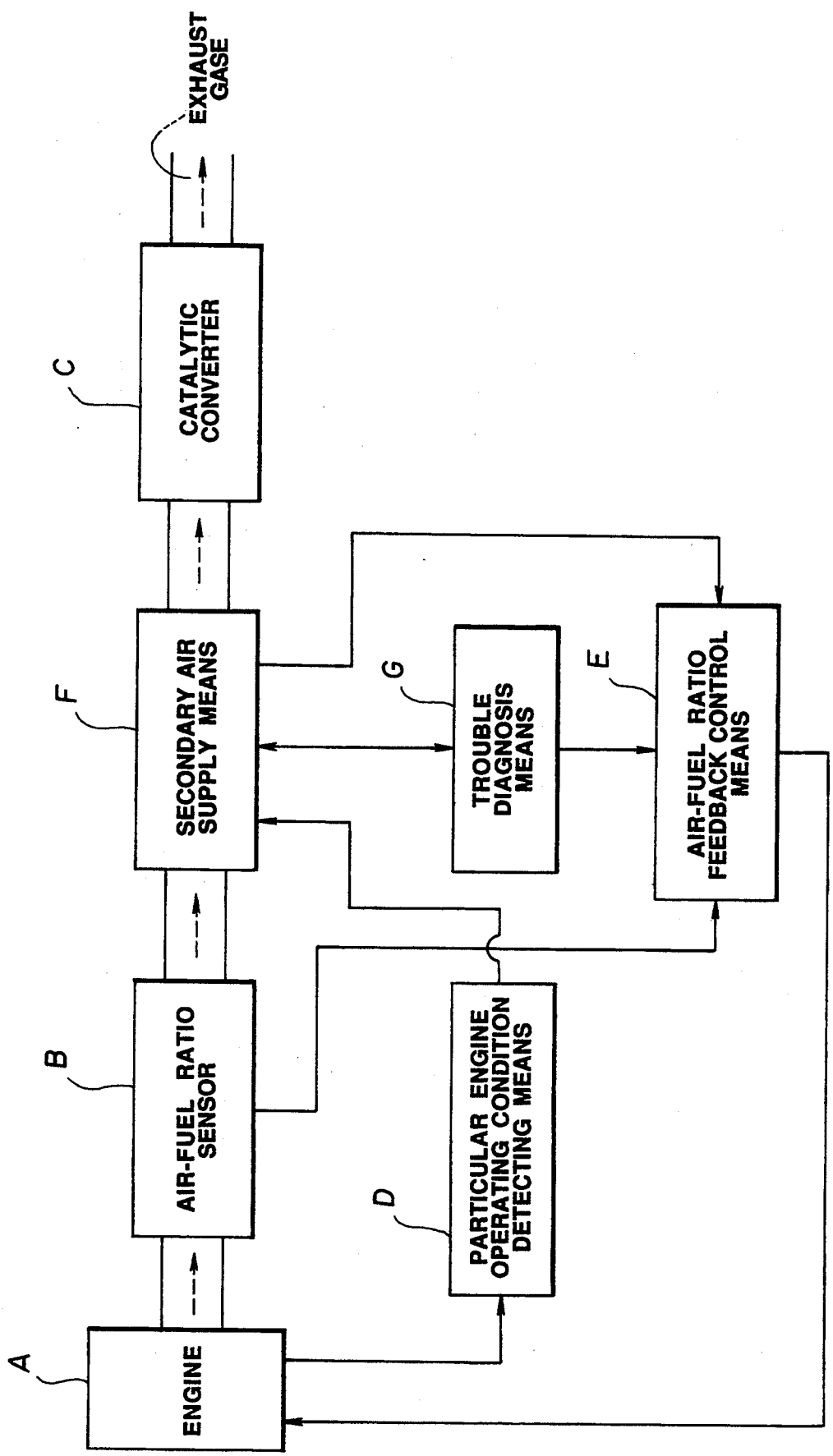
FIG. 1 is a block diagram of a system for preventing deterioration of exhaust emission in case of trouble in secondary air supply in an internal combustion engine, according to an embodiment of the present invention.

Referring to FIG. 1, a system for preventing deterioration of exhaust emission in case of trouble in secondary air supply in an internal combustion engine, according to an embodiment of the present invention will first be described briefly. The system comprises an air-fuel ratio sensor B and a catalytic converter C disposed in an exhaust passage of an internal combustion engine A, a particular engine operating condition detecting means D, an air-fuel ratio feedback control means E responsive to a feedback signal from the air-fuel ratio sensor B for performing such a feedback control that brings the air-fuel ratio closer to a target air-fuel ratio (i.e. a stoichiometric air-fuel ratio) at any time other than the time of the particular operating condition of the engine A, a secondary air supply means F for suspending the air-fuel ratio feedback control at the time of the particular operating condition of the engine A and supplying an additional amount of fuel for causing an air-fuel mixture to become richer than that of the target air-fuel ratio whilst supplying secondary air to the exhaust passage upstream of the catalytic converter C, and trouble diagnosis means G for making a decision on trouble of the secondary air supply system F. When it is determined by the trouble diagnosis means G that the secondary air supply means F is in trouble, the operation of the secondary air supply means F is suspended whilst supply of the additional amount of fuel is stopped for bringing the air-fuel ratio closer to the target air-fuel ratio.

With such a structure, it becomes possible to regulate the air-fuel ratio closer to a target air-fuel ratio (i.e., stoichiometric) by an open-loop control in case of malfunction trouble of the secondary air supply system. This enables the catalytic converter to operate with a high conversion efficiency, thus making it possible to prevent deterioration of the exhaust emission otherwise caused in case of trouble or failure of a comparable prior art secondary air supply system.

Figure 2:
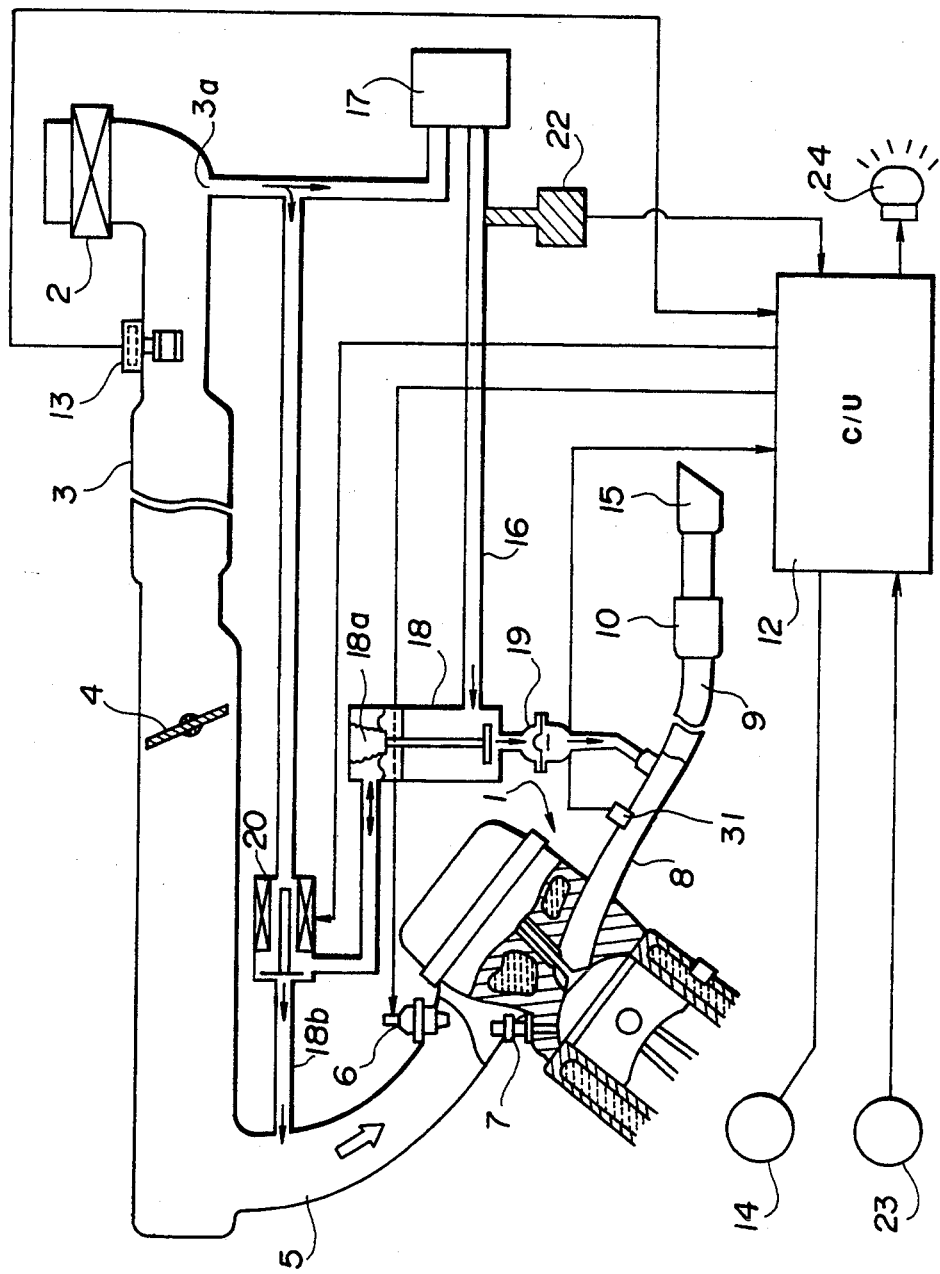
FIG. 2 is a schematic view of a more specific embodiment of the present invention.

Referring to FIG. 2, the present invention will be described with respect to a more specific embodiment. In the figure, an internal combustion engine is generally designated by 1 and includes an air cleaner 2, an intake conduit 3, a throttle valve 4 and an intake manifold 5. The intake manifold 5 is provided, at each branch portions, with fuel injectors 6 for supplying fuel to each cylinders of the engine 1, independently. Fuel injector 6 is of the solenoid-operated type and adapted to open when its solenoid is energized and close when deenergized. Fuel injector 6 opens in response to a signal from a control unit 12 and injects fuel into the combustion chamber of the engine 1. Though not shown, there are provided a pressure pump for delivery of fuel and a pressure regulator for regulation of fuel pressure to a predetermined value.

Each combustion chamber of the engine 1 is provided with a spark plug 7 to ignite and combust an air-fuel mixture supplied thereto. Exhaust gases are emitted from the engine 1 through an exhaust manifold 8, exhaust conduit 9 and a three-way catalytic converter 10. The three-way catalytic converter 10 accelerates oxidation of CO, HC and reduction of NOx for thereby purifying the exhaust gases.

The control unit 12 is equipped with a microcomputer consisting of CPU, ROM, RAM, A/D converter, input/output interface, etc. and receives signals from various sensors to process those data and control the operation of the fuel injectors 6.

One of the sensors is an air flow sensor 13 which is disposed in the intake conduit 3 for detecting a flow rate Q of air supplied to the engine 1 and producing a signal representative thereof. Another is a crank angle sensor 14 installed in a distributor (not shown), so that by counting a crank unit angle signal produced by the crank angle sensor 14 in timed relation to engine speed or by measuring a cycle of a crank reference angle signal an engine speed N is detected. A further one is an oxygen sensor 31 which is disposed in a common conduit portion of the exhaust manifold 8 to serve as an air-fuel ratio sensor. The oxygen sensor 31 is constructed to supply to the control unit 12 a feedback signal for feedback control of the air-fuel ratio of the mixture to be supplied to the engine 1. More specifically, the sensor 31 produces a signal representative of the oxygen content in the exhaust gases and, for example, generates an electromotive force proportional to the ratio of the oxygen content in the exhaust gases to that in the atmosphere. In response to the feedback signal from the oxygen sensor 31, the air-fuel ratio of the mixture to be supplied to the engine 1 is regulated closer to a target air-fuel ratio (i.e., stoichiometric air-fuel ratio).

Indicated by 15 is a muffler constituting part of the exhaust conduit 9 of the engine 1 and located downstream of the catalytic converter 10.

The engine I is equipped with a secondary air supply system which includes a secondary air supply conduit 16 extending away from the intake conduit 3 for supplying secondary air to the exhaust conduit 9 upstream of the catalytic converter 10 and downstream of the oxygen sensor 31. The secondary air supply conduit 16 is provided with a motor-driven air pump 17, a vacuum-operated control valve 18 and a check valve 19. The control valve 18 has a control pressure chamber 18a which is connected to a control pressure introducing conduit 18b interconnecting the secondary air supply conduit 16 upstream of the air pump 17 and the intake manifold 5 downstream of the throttle valve 4. A solenoid-operated directional control valve 20 is installed in the conduit 18b and operated in response to a signal from the control unit 12 so that at the time of a particular engine operating condition such as an idling condition vacuum is drawn into the control pressure chamber 18a to open the control valve 18 for thereby supplying secondary air to the exhaust conduit 9 whereas at any time other than the time of the particular engine operating condition the atmospheric pressure is drawn to the control pressure chamber 18a to close the control valve 18 for thereby stopping supply of secondary air to the exhaust conduit 9.

A boost sensor 22 is disposed in the secondary air supply conduit 16 for detecting the pressure of the secondary air delivered from the air pump 17 to the exhaust conduit 9, i.e., %he pressure in the secondary air supply conduit 16 and supplying a signal indicative hereof to the control unit 12. Trouble diagnosis of the secondary air supply system is made on the basis of the detected value from the boost sensor 22. A warning lamp 24 is turned on when it is determined that the secondary air supply system is in trouble.

In the meantime, indicated by reference numeral 23 is a start switch.

Figure 3:
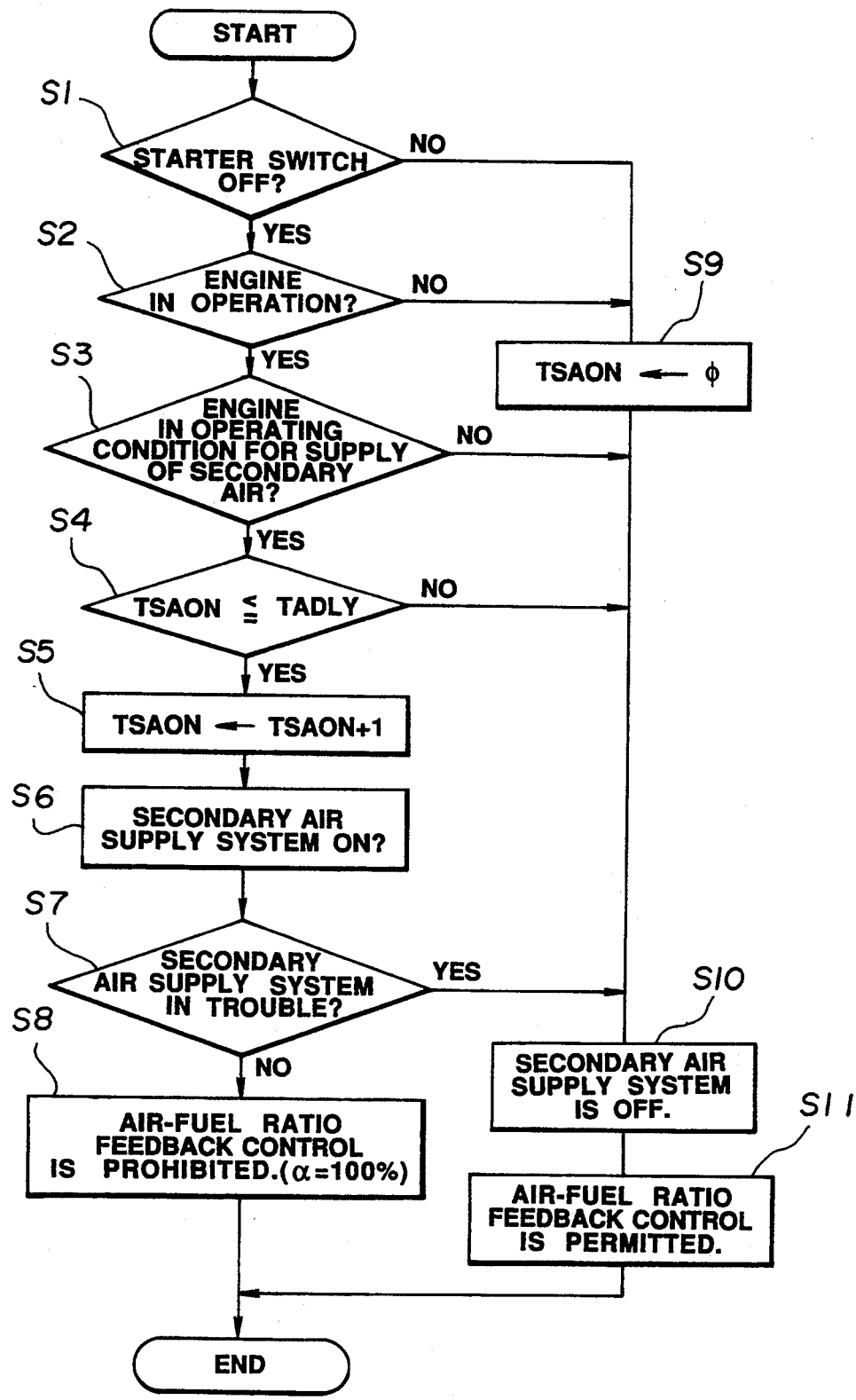
FIG. 3 is a flowchart of a control routine for use in the embodiment of FIG. 2.
Figure 4:
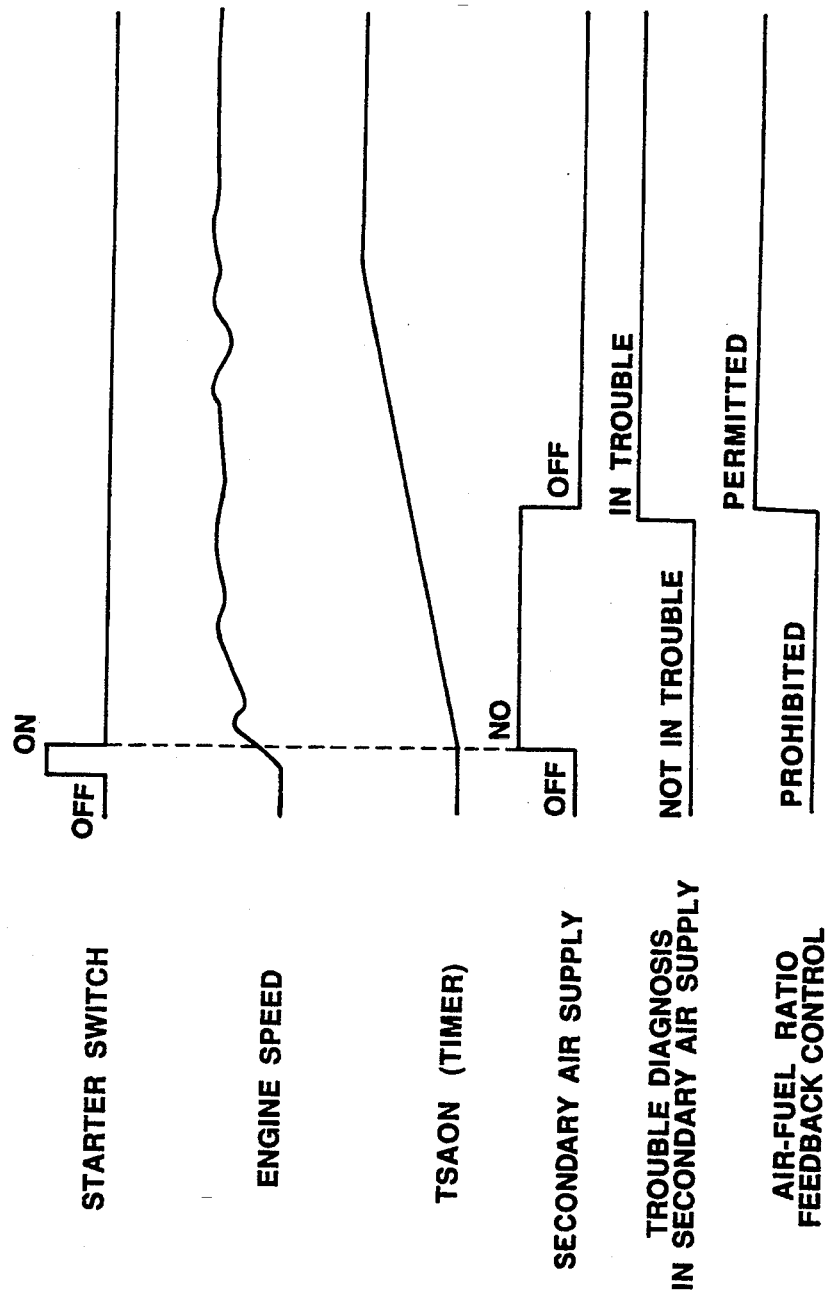
FIG. 4 is a time chart for illustration of the operation of the embodiment of FIG. 2.

The operation of the system according to the above described embodiment of the present invention will be described with additional reference to FIGS. 3 and 4. In the meantime, the control unit 12 is programatically provided with a trouble diagnosis means and an air-fuel ratio feedback control means as will be understood from the following description with reference to the flow-chart of FIG. 3.

Firstly, at step S1, it is determined whether the start switch 23 is OFF, i.e., whether it is the time after the start switch 23 is turned on to start the engine. When it is determined that the start switch 23 is OFF, the control proceeds to step S2. On the other hand, when it is determined that the start switch 23 is ON, the control proceeds to step S9 where a secondary air ON determining timer (TSAON), i.e., a timer for determining whether it is the time for turning on the secondary air supply system, is cleared.

At step S2, it is determined whether the engine i is in operation at the speed N indicated by the signal from the crank angle sensor 14, i.e., whether the engine 1 is operating at a predetermined speed N after smarting. When the engine 1 is in operation the control proceeds to step S3, whereas when the engine 1 is in a halted condition the control proceeds to step S9 where the secondary air ON determining timer (TSAON) is cleared.

At step S3, it is determined whether the engine 1 is in an operating condition in which supply of secondary air is to be ON, i.e., secondary air is to be supplied. When the engine 1 is in the operating condition in which secondary air is to be supplied, the control proceeds to step S4. On the other hand, when the engine 1 is not in the operating condition in which secondary air is to be supplied the control proceeds to step S10 in which the secondary air supply system is OFF, i.e., supply of secondary air by the secondary air supply system is stopped and then to step S11 where a coefficient α of air-fuel ratio feedback correction is released from a fixed state so that normal air-fuel ratio feedback control is started again.

At step S4, it is determined by the ON determining timer (TSAON) whether it has passed a predetermined time (TADLY) for starting supply of secondary air. When it is determined that the predetermined time (TADLY) has not yet passed, the control proceeds to step S5 where increment of the determining timer (TSAON) is made. On the other hand, when it is determined that the predetermined time (TADLY) has passed, the control proceeds to step S10 where the secondary air supply system is OFF, i.e., supply of secondary air by the secondary air supply system is stopped and further to step S11 where the coefficient α of air-fuel ratio feedback correction is released from a fixed state so that normal air-fuel ratio feedback control in which the coefficient α is variably controlled in response to a feedback signal from the oxygen sensor 31, is started again.

At step S6, the secondary supply system is ON, i.e., supply of secondary air by the secondary air supply system is started. At step S7, a decision is made on trouble of the secondary air supply system. When it is determined that the secondary air supply system is not in trouble, the control proceeds to step S8. On the other hand, when it is determined that the secondary air supply system is in trouble, the control proceeds to step S10 where the secondary air supply system is OFF, i.e., the operation of the secondary air supply system is stopped and further to step S11 where the coefficient α air-fuel ratio feedback correction is released from a fixed state so that normal air-fuel ratio feedback control is started again.

At step S8, the coefficient α of air-fuel ratio feedback correction is fixed to 1 (100%) so that the air-fuel ratio feedback control is stopped whilst an additional amount of fuel is supplied to the engine 1 for thereby causing the mixture to be supplied to the engine to become richer than that by the target air fuel ratio (i.e., stoichiometric air-fuel ratio).

In the meantime, the steps S1~S3 constitute a particular engine operating condition detecting means, the steps S4~S6 constitute a secondary air supply means, and the step S7 constitute a trouble diagnosis means.

In this manner, when it is determined that the secondary air supply system is in trouble, the operation of the secondary air supply system is stopped whilst the air-fuel ratio feedback control system is started again and the supply of the additional amount of fuel is stopped for regulating the air-fuel ratio closer to the target air-fuel ratio (i.e., stoichiometric air-fuel ratio) on the basis of the feedback signal from the oxygen sensor disposed in the exhaust conduit 9 of the engine 1, whereby the catalytic converter 10 can operate with a high conversion efficiency (purifying efficiency) and prevent deterioration of the exhaust emission otherwise caused in case of trouble of the comparable prior art secondary air supply system.

Figure 5:
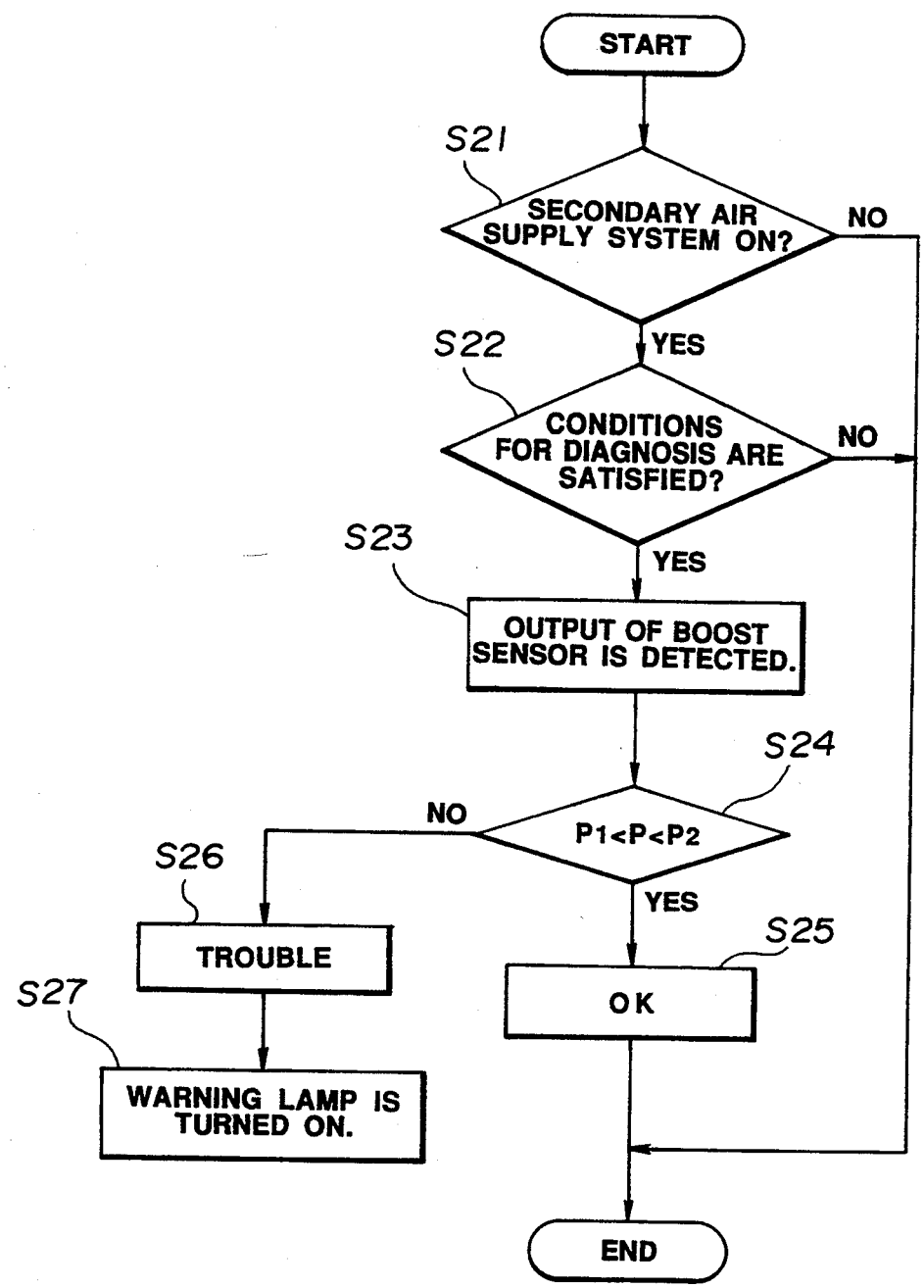
FIG. 5 is a flowchart of a trouble diagnosis performed by the embodiment of FIG. 2.

The routine of trouble diagnosis of the secondary air supply system will be described with reference to the flowchart of FIG. 5.

Firstly, at step S21 it is determined whether the secondary air supply system is ON, i.e., in operation. When it is determined that the secondary air supply system is ON, the control proceeds to step S22. When it is determined that the secondary air supply system is OFF, the steps S22~S25 in the main flow of the chart are bypassed and the control is ended.

At step S22, it is determined whether the conditions for carrying out the trouble diagnosis are satisfied. When it is determined that the conditions are satisfied, the control proceeds to step S23 where the pressure P of the secondary air delivered from the motor-driven air pump 17 is detected. When it is determined that the conditions are not satisfied, the steps S23~S25 onward are bypassed and the control is ended.

At step S24, it is determined whether the above described pressure P is within a normal pressure range (i.e., $P_1 < P < P_2$). If $P_1 < P < P_2$, it is determined that the secondary air supply system (S26) is not in trouble and the control bypasses the steps S25 and onward and is ended. If $P \leq P_1$ or $P \geq P_2$, it is determined that the secondary air supply system (S26) is in trouble and the warning lamp 24 is turned on (S27).

Figure 6:
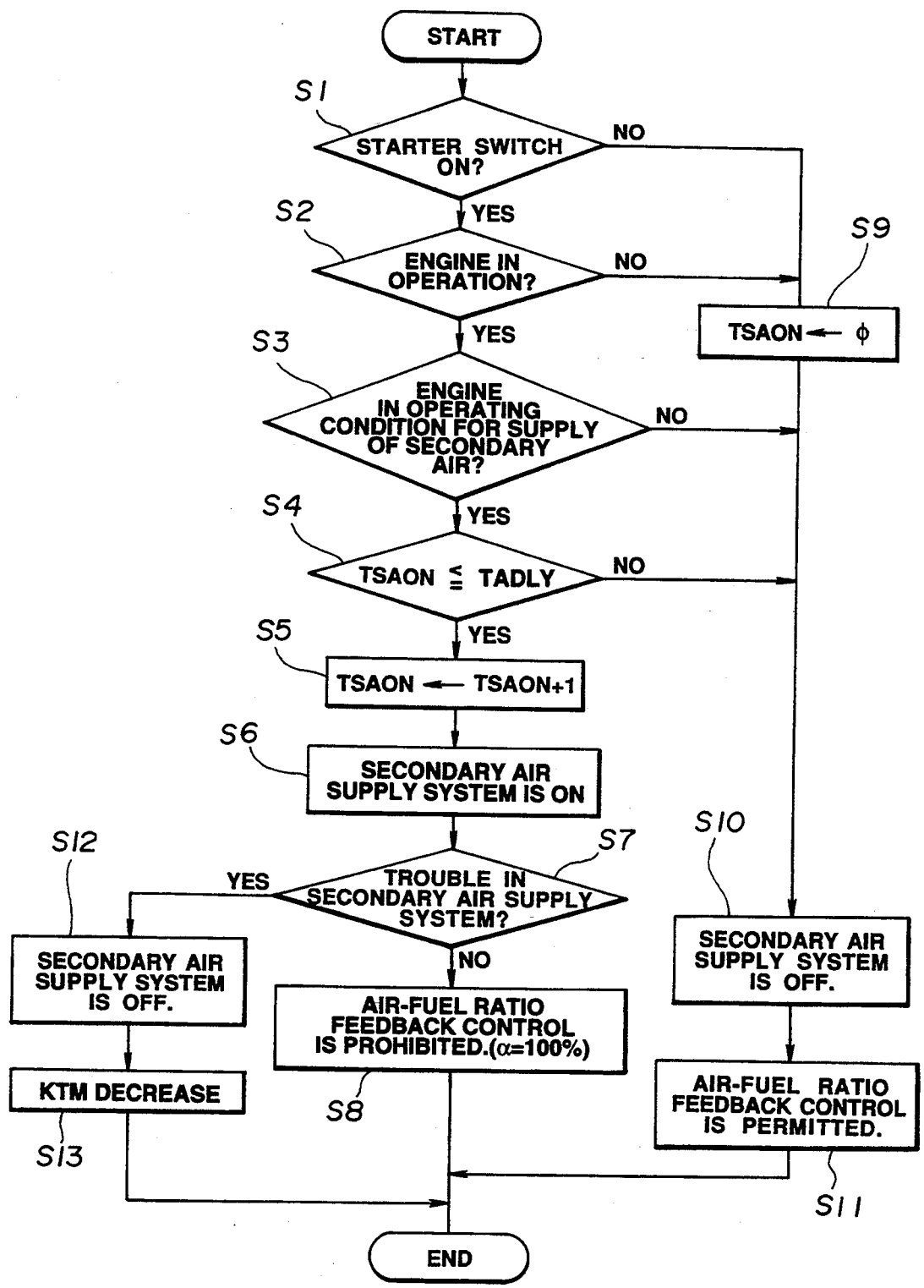
FIG. 6 is a flowchart for illustration of the operation of a further embodiment.

Referring to FIGS. 6 and 7, another embodiment of the present invention will be described. In this embodiment, steps S1~S6 are the same to those of the flow-chart of FIG. 3, so repetitive description thereto is omitted. Further, in this embodiment, the functions of a trouble diagnosis means and an additional fuel supply means are programatically provided to the control unit 12 as will be understood from the flowchart of FIG. 6.

At step S7, it is determined whether the secondary air supply system is in trouble. When it is determined that the secondary air supply system is in trouble, the control proceeds to step S8 where the coefficient α of air-fuel ratio feedback correction is fixed to 1 (100%) for thereby stopping the air-fuel ratio feedback control whilst an additional amount of fuel is supplied to the engine 1 for causing the mixture to become richer than that of the target air-fuel ratio (i.e., stoichiometric).

When it is determined that the secondary air supply system is in trouble, the control proceeds to step S12 where the secondary air supply system is OFF, i.e., the operation of the secondary air supply system is stopped and to step S13 where supply of the additional amount of fuel is stopped for thereby bringing the air-fuel ratio closer to the target air-fuel ratio.

While the air-fuel ratio is controlled by an open-loop system in the above manner, the resulting air-fuel ratio becomes closer to the target air-fuel ratio similarly to the closed-loop or feedback control in the previous embodiment of FIGS. 2 to 5, thus making it possible to prevent deterioration of the exhaust emission otherwise caused at the time of trouble of a comparable prior art secondary air supply system.

What is claimed is:

1. A system for preventing deterioration of exhaust emission in case of trouble in secondary air supply in an internal combustion engine, comprising:
    an air-fuel ratio sensor disposed in an exhaust passage of the engine for detecting a content of a constituent of exhaust gases emitted from the engine and producing a feedback signal for control of an air-fuel ratio of a mixture to be supplied to the engine;
    a catalytic converter disposed in the exhaust passage;
    a particular engine operating condition detecting means for detecting a particular operating condition of the engine and producing a signal indicative thereof;
    an air-fuel ratio feedback control means responsive to a feedback signal from said air-fuel ratio sensor for regulating the air-fuel ratio closer to a target air-fuel ratio at any time other than the time of the particular operating condition of the engine;
    secondary air supply means responsive to the signal from said particular engine operating condition detecting means for suspending operation of said air-fuel ratio feedback control means at the time of the particular operating condition of the engine and supplying an additional amount of fuel for causing an air-fuel mixture to become richer than that by the target air-fuel ratio whilst supplying secondary air the exhaust passage upstream of said catalytic converter; and
    trouble diagnosis means for making a decision on trouble of said secondary air supply means in such a manner that when it is determined that said secondary air supply means is in trouble, operation of said secondary air supply means is suspended whilst supply of the additional amount of fuel is stopped for bringing the air-fuel ratio closer to the target air-fuel ratio.

2. A system according to claim 1, wherein said particular engine operating condition is an idling condition of the engine.

3. A system according to claim 1, wherein said air-fuel ratio sensor comprises an oxygen sensor for detecting a content of oxygen in the exhaust gases.

4. A system according to claim 1, wherein said trouble diagnosis means comprises means for releasing said air-fuel ratio feedback control means from suspension by said secondary air supply means when it is determined that said secondary air supply means is in trouble.

5. An internal combustion engine comprises:
    an air-fuel ratio feedback control system for regulating an air-fuel ratio of a mixture supplied to the engine closer to a stoichiometric value in response to a feedback signal from a sensor at anytime other than the time of a particular engine operating condition;
    a catalytic converter disposed in an exhaust passage of the engine;
    a secondary air supply system for suspending operation of said air-fuel ratio feedback control system at the time of the particular operating condition of the engine and supplying an additional amount of fuel for causing the mixture to become richer than that of the stoichiometric air-fuel rations whilst supplying secondary air to the exhaust passage upstream of said catalytic converter; and
    a system for preventing deterioration of exhaust emission of the engine at the time of trouble of the secondary air supply system, said preventing system having diagnosis means for determining whether said secondary air supply system is in trouble, and means for stopping supply of said additional amount of fuel by said secondary air supply system for thereby bringing the air-fuel ratio closer to the stoichiometric air-fuel ratio when it is determined that said secondary air supply system is in trouble.

6. An internal combustion engine according to claim 5, wherein said preventing system further comprises means for releasing said air-fuel ratio feedback control system from suspension by said secondary air supply system when it is determined that said secondary air supply system is in trouble.

7. In an internal combustion engine having an air-fuel ratio feedback control system for regulating an air-fuel ratio of a mixture supplied to the engine closer to a stoichiometric value in response to a feedback signal from a sensor at any time other than the time of a particular engine operating condition, a catalytic converter disposed in an exhaust passage of the engine, and a secondary air supply system for suspending operation of the air-fuel ratio feedback control system at the time of the particular operating condition of the engine and supplying an additional amount of fuel for causing mixture to become richer than that of the stoichiometric air-fuel ratio whilst supplying secondary air to the exhaust passage upstream of the catalytic converter,
    a system for preventing deterioration of exhaust emission of the engine in case of trouble of the secondary air supply system, comprises means for determining whether the secondary air supply system is in trouble, and means for stopping supply of the additional amount of fuel by the secondary air supply system for thereby bringing the air-fuel ratio closer to the stoichiometric air-fuel ratio when it is determined that the secondary air supply system is in trouble.

8. In an internal combustion engine having an air-fuel ratio feedback control system for regulating an air-fuel ratio of a mixture supplied to the engine closer to a stoichiometric value in response to a feedback signal from a sensor at any time other than the time of a particular engine operating condition, a catalytic converter disposed in an exhaust passage of the engine, and a secondary air supply system for suspending operation of the air-fuel ratio feedback control system at the time of the particular operating condition of the engine and supplying an additional amount of fuel for causing the mixture to become richer than that of the stoichiometric air-fuel ratio whilst supplying secondary air to the exhaust passage upstream of the catalytic converter through a secondary air supply conduit, a system for preventing deterioration of exhaust emission of the engine in case of trouble of the secondary air supply system, comprises means for detecting a pressure within the secondary air supply conduit and determining whether the secondary air supply system is in trouble on the basis of a detected pressure within the secondary air supply conduit, and means for stopping supply of the additional amount of fuel by the secondary air supply system whilst releasing the air-fuel ratio feedback control system from suspension by the secondary air supply system for thereby regulating the air-fuel ratio closer to the stoichiometric air-fuel ratio when it is determined that the secondary air supply system is in trouble.

9. In an internal combustion engine having an air-fuel ratio feedback control system for regulating an air-fuel ratio of a mixture supplied to the engine closer to a stoichiometric value in response to a feedback signal from a sensor at any time other than the time of a particular engine operating condition, a catalytic converter disposed in an exhaust passage of the engine, and a secondary air supply system for suspending operation of the air-fuel ratio feedback control system at the time of the particular operating condition of the engine and supplying an additional amount of fuel for causing the mixture to become richer than that of the stoichiometric air-fuel ratio whilst supplying secondary air to the exhaust passage upstream of the catalytic converter, a method for preventing deterioration of exhaust emission of the engine in case of trouble of the secondary air supply system, comprises:

determining whether the secondary air supply system is in trouble, and stopping supply of the additional amount of fuel by the secondary air supply system for thereby bringing the air-fuel ratio closer to the stoichiometric air-fuel ratio when it is determined that the secondary air supply system is in trouble.

10. In an internal combustion engine having an air-fuel ratio feedback control system for regulating an air-fuel ratio of a mixture supplied to the engine closer to a stoichiometric value in response to a feedback signal from a sensor at any time other than the time of a particular engine operating condition, a catalytic converter disposed in an exhaust passage of the engine, and a secondary air supply system for suspending operation of the air-fuel ratio feedback control system at the time of the particular operating condition of the engine and supplying an additional amount of fuel for causing the mixture to become richer than that of the stoichiometric air-fuel ratio whilst supplying secondary air to the exhaust passage upstream of the catalytic converter through a secondary air supply conduit, a method for preventing deterioration of exhaust emission of the engine in case of trouble of the secondary air supply system, comprises:

detecting a pressure within the secondary air supply conduit;

determining whether the secondary air supply system is in trouble on the basis of the pressure within the secondary air supply conduit, and stopping supply of the additional amount of fuel by the secondary air supply system whilst releasing the air-fuel ratio feedback control system from suspension by the secondary air supply system for thereby regulating the air-fuel ratio closer to the stoichiometric air-fuel ratio when it is determined that the secondary air supply system is in trouble.

* * * * *